(12) United States Patent
Chen

(10) Patent No.: US 8,136,751 B2
(45) Date of Patent: Mar. 20, 2012

(54) SINGLE FREE-END WIRE REEL

(75) Inventor: Yi-Chen Chen, Taipei (TW)

(73) Assignees: Wang Wang Dah Enterprises Co., Ltd., Taipei (TW); Dong Guan Top Den Electronics Limited Company, Dongguan (CN)

( * ) Notice: Subject to any disclaimer, the term of this patent is extended or adjusted under 35 U.S.C. 154(b) by 152 days.

(21) Appl. No.: 12/756,469

(22) Filed: Apr. 8, 2010

(65) Prior Publication Data

US 2011/0139918 A1 Jun. 16, 2011

(30) Foreign Application Priority Data

Dec. 15, 2009 (JP) .................... 2009-008890

(51) Int. Cl.
*B65H 75/48* (2006.01)

(52) U.S. Cl. ................ 242/378.1; 242/378.2; 242/378.3

(58) Field of Classification Search .................. 242/378, 242/378.1–378.4; 191/12.2 R
See application file for complete search history.

(56) References Cited

U.S. PATENT DOCUMENTS

| 7,384,013 | B2 * | 6/2008 | Yen ................................ 242/378 |
| 7,523,883 | B2 * | 4/2009 | Cheng ............................ 242/378 |
| 7,604,194 | B2 * | 10/2009 | Chang ........................ 242/378.1 |

FOREIGN PATENT DOCUMENTS

TW             M3003196        12/2006

* cited by examiner

*Primary Examiner* — Sang Kim
(74) *Attorney, Agent, or Firm* — C. G. Mersereau; Nikolai & Mersereau, P.A.

(57) ABSTRACT

A single free-end wire reel includes a leveled area disposed on a rotary member to level arc tracks and a gap formed at the intersection of the arc tracks to change the motion track of a limit block. The present invention not only keeps the limit block to have a dual-positioning function when doing a circular motion but also controls the length of a wire exactly, providing a smooth operation when extending or extracting the wire.

7 Claims, 12 Drawing Sheets

SINGLE FREE-END WIRE REEL

BACKGROUND OF THE INVENTION

1. Field of the Invention

The present invention relates to a single free-end wire reel, and more particularly to a device to extend and retract a wire.

2. Description of the Prior Art

A wire earphone or a mouse uses a transmission wire to get or transmit data. A key ring, stationery or a decoration also uses a wire for retraction or extension. In the past, the wire is wound or collected irregularly. Sometimes, the wire is to wind around, which is not convenient when in use. Therefore, there are some improved products on the market for extending and retracting a wire. This type of product comprises a spiral spring to extend/retract the wire through the spiral route of the spiral spring. When the wire is pulled out in use, the operation to pull out the wire is slightly held up by the outward force of the spiral spring. However, the force of the spiral spring can be overcome easily, so the wire is retracted along a track route. Applying an appropriate force, the wire can be retracted or extended smoothly.

Taiwan Utility Model Publication number M303196 discloses a single free-end wire reel. When the wire is pulled by the user, a ball will be moved between a first arc track and a sixth arc track along with extension and retraction of the wire. However, the distance of each arc track is too short, which influences the operation to extend and retract the wire. Accordingly, the inventor of the present invention has devoted himself based on his many years of practical experiences to develop an improved single free-end wire reel.

SUMMARY OF THE INVENTION

The primary object of the present invention is to improve a limit block to move in each arc track of a rotary member for the limit block to have a dual-positioning function when the limit block is moved in the arc tracks. The length of a wire can be controlled exactly when extending or retracting the wire. In order to achieve the object, a leveled area is disposed on the rotary member to level the arc tracks and a gap is formed at the intersection of the arc tracks.

Furthermore, the limit block and a track area of a first casing can be in different designs. In a first embodiment, the limit block is a ball and the track area is a linear limit trough. In a second embodiment, the limit block is a U-shaped block and the track area is a U-shaped trough.

DETAILED DESCRIPTION OF THE PREFERRED EMBODIMENTS

Embodiments of the present invention will now be described, by way of example only, with reference to the accompanying drawings.

Figure 1:
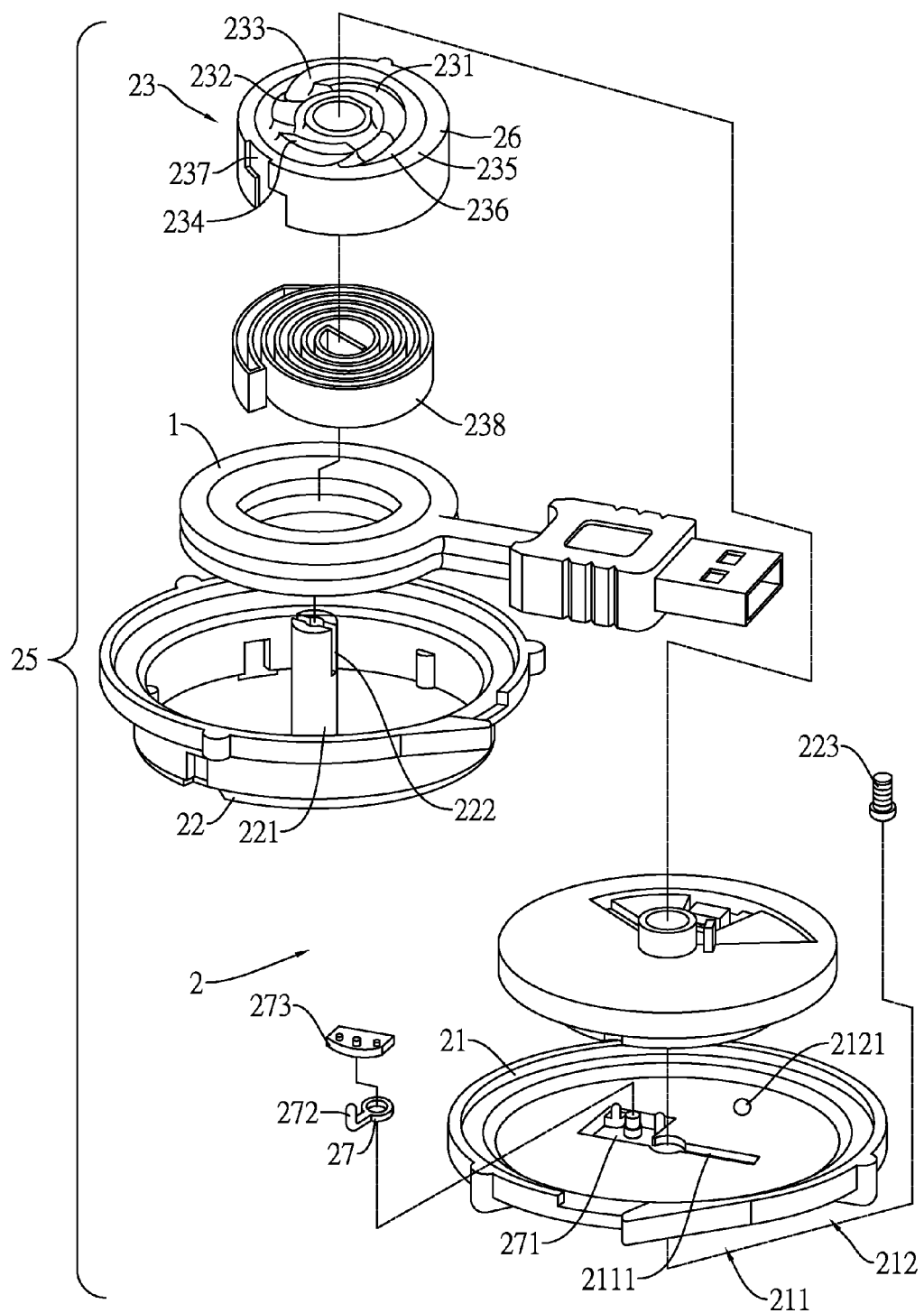
FIG. 1 is an exploded view of the present invention.
Figure 2:
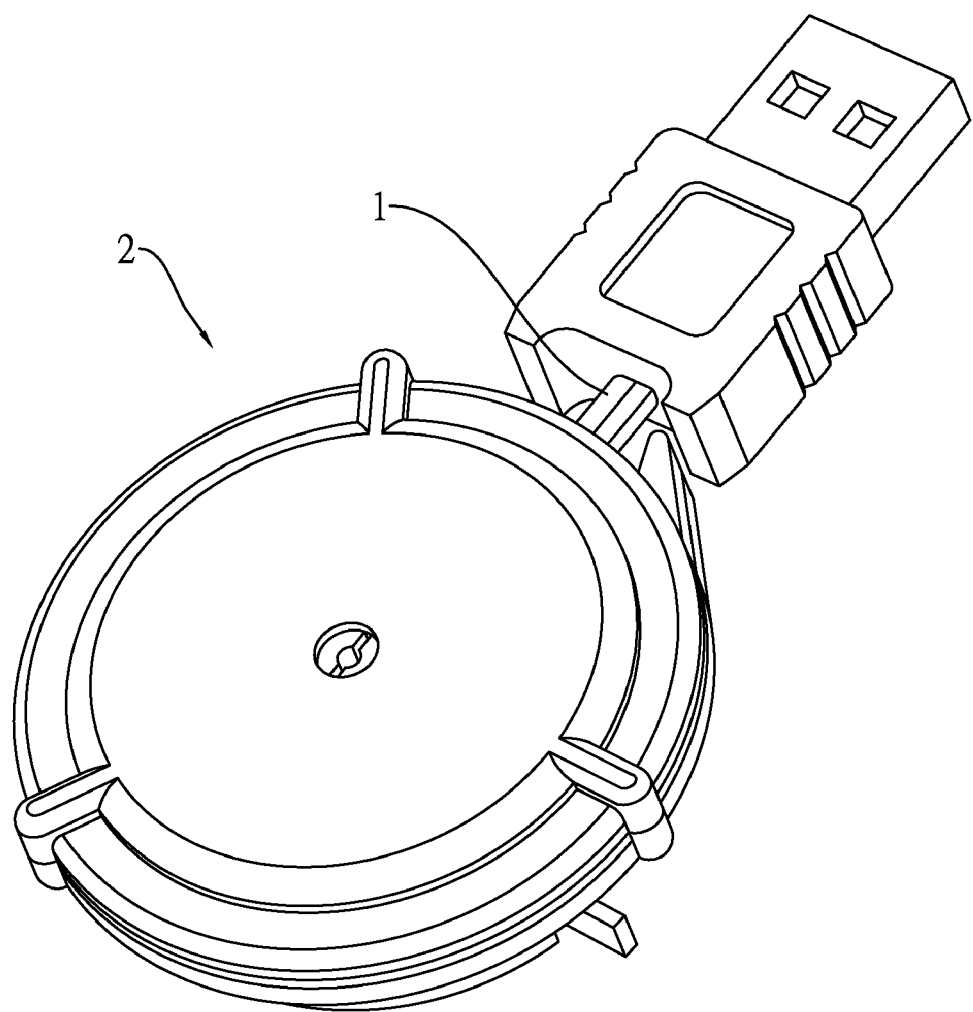
FIG. 2 is a schematic view of a first preferred embodiment of the present invention.

As shown in FIG. 1 and FIG. 2, a single free-end wire reel according to a first preferred embodiment of the present invention comprises a wire 1 having one single free end. The wire 1 is wound in a reel 2 for extension and retraction when in use. The reel 2 comprises a first casing 21 and a second casing 22 which are coupled to each other. A rotary member 23 is provided in a space defined between the first casing 21 and the second casing 22.

The rotary member 23 has an engaging notch 237 on a circumferential portion thereof. A spiral spring 238 is provided inside the rotary member 23 to provide a force to turn the rotary member 23 for winding the wire 1. A first limit unit 25 is provided between an outer side of the rotary member 23 and an inner side of the first casing 21. In this embodiment, the first limit unit 25 comprises a first arc track 231 on a surface of the rotary member 23, a second arc track 232 next to one end of the first arc track 231, a third arc track 233 close to the second arc track 232, a track area 211 formed on the inner side of the first casing 21, and a limit block 212 disposed in the track area 211. When the first casing 21 and the second casing 22 are coupled to each other and the rotary member 23 is turned, the limit block 212 in the track area 211 of the first casing 21 will be confined to run in the first arc track 231, the second arc track 232 and the third arc track 233, so that the rotary member 23 is limited to turn within the first limit unit 25 when the rotary member 23 is deflected.

Furthermore, a second limit unit 26 is provided between the outer side of the rotary member 23 and the inner side of the first casing 21 to disperse and balance the force of the first limit unit 25 when the rotary member 23 is deflected.

Besides, the rotary member 23 has a fourth arc track 234 on the surface of the rotary member 23. In this embodiment, the fourth arc track 234 is symmetrical to the first arc track 231. One end of the fourth arc track 234 has a fifth arc track 235 which is symmetrical to the second arc track 232. A sixth arc track 236 is disposed close to the fifth arc track 235. The sixth arc track 236 is symmetrical to the third arc track 233. With the fourth arc track 234, the fifth arc track 235 and the sixth arc track 236 which are respectively symmetrical to the first arc track 231, the second arc track 232 and the third arc track 233, the turning direction of the rotary member 23 is not limited.

The second casing 22 has an inner side provided with a shaft 221. The shaft 221 has an insertion groove 222 to connect with one end of the spiral spring 238. A screw 223 is inserted through the first casing 21 and screwed to the insertion groove 222.

Figure 3:
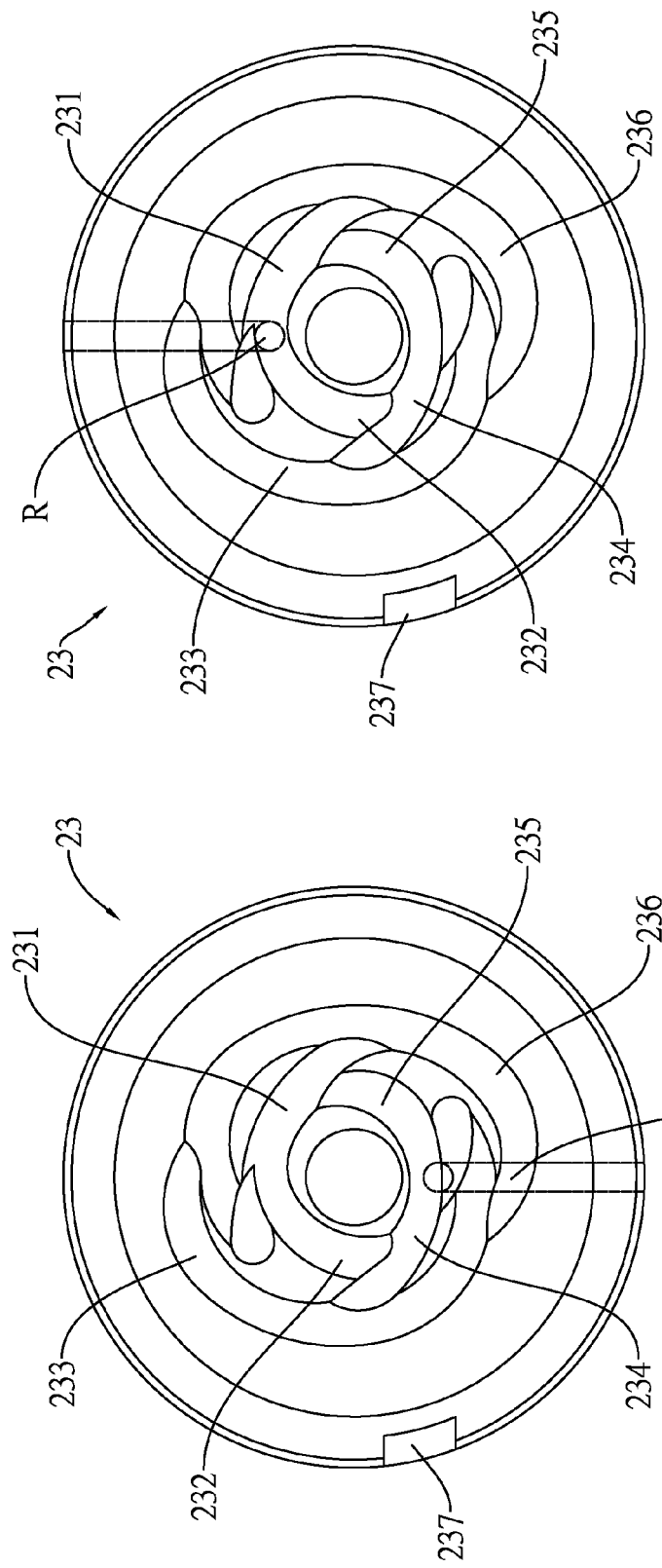
FIG. 3 is a schematic view of the prior art.

FIG. 3 is a schematic view to show that a ball R and a swing arm 27 of the two limit units 25 and 26 are located in respective troughs of the rotary member 23. The limit function of the ball R in the first limit unit 25 is the prior art, and won't be described hereinafter. FIG. 3 is to show the arrangement of the second limit unit 26 in the rotary member 23 and the corresponding arrangement of the first limit unit 25. When the first limit unit 25 and the second limit unit 26 provide a single limit function synchronously, the second limit unit 26 is to disperse and balance the force of the first limit unit 25 when the rotary member 23 is deflected. Due to the two limit units, the engaged point of the wire is shortened (half of per limit unit), so that the extending length of the wire can be controlled exactly.

Figure 4:
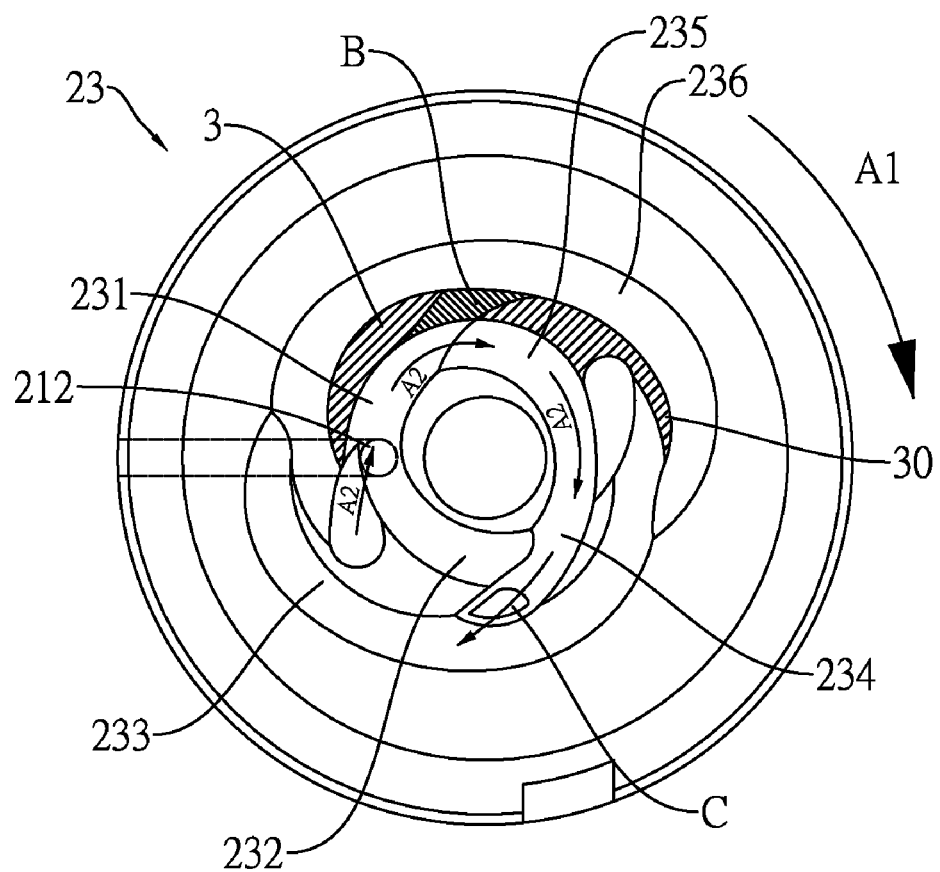
FIG. 4 is a top view of the rotary member of the present invention.

FIG. 4 is to show the improvement of FIG. 3, which is the feature of the present invention. As shown in FIG. 3, leveled areas 3, 30 are provided between the first arc track 231, the fifth arc track 235 and the sixth arc track 236 to level the height difference between the first arc track 231, the fifth arc track 235 and the sixth arc track 236. A stop gap B is formed at the intersection of the first arc track 231 and the fifth arc track 235. By the aforesaid design, when the wire 1 is pulled by the user, the rotary member 23 will be turned clockwise, as designated by the arrow A1, and the wire 1 will be turned as designated by the arrow A2. The limit block 212 is stopped by the stop gap B to pass through a critical area C which is disposed at the intersection of the first arc track 231 and the fourth arc track 234 and to enter the third arc track 233, namely, the wire 1 is in a pulling status when the limit block 212 is turned clockwise in the third arc track 233 and the sixth arc track 236.

Figure 5:
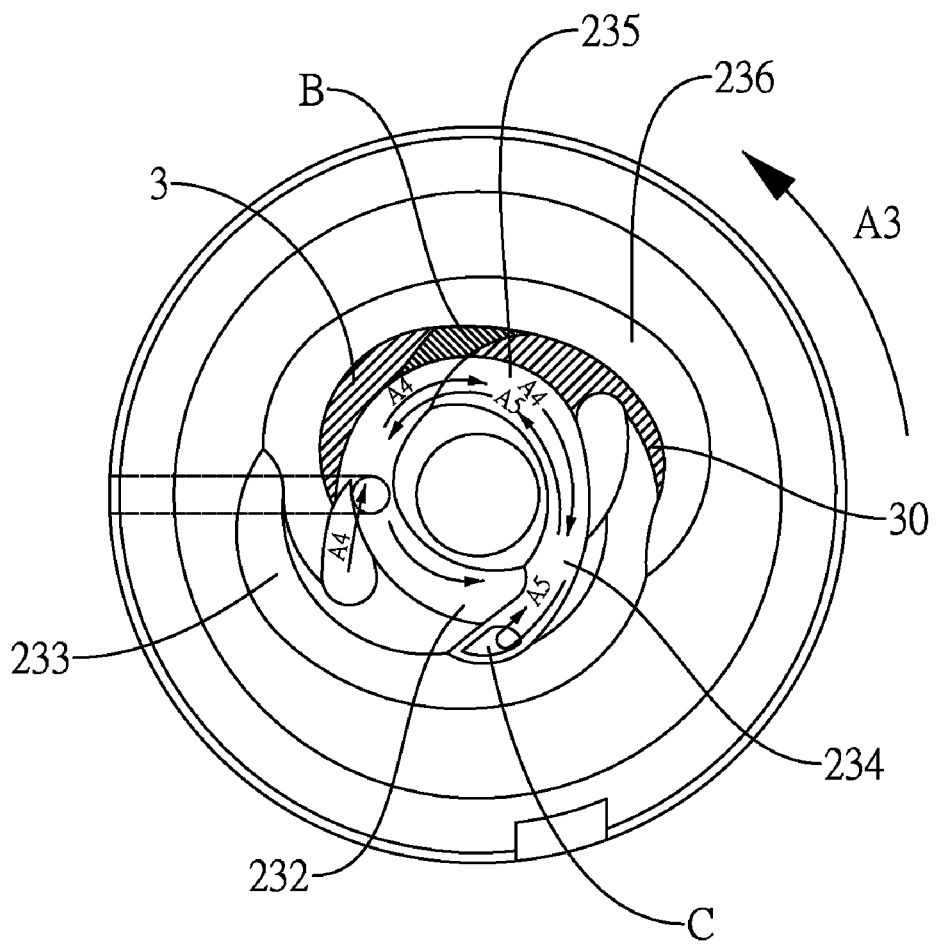
FIG. 5 is another top view of the rotary member of the present invention.

Referring to FIG. 5, when the wire 1 is retracted, the limit block 212 will be pulled to the leveled areas 3, 30 by the rotary member 23 which is first turned clockwise. Due to the obstruction of the leveled areas 3, 30 and the stop gap B, the limit block 212 is unable to pass from the first arc track 231 to the third arc track 233, so the limit block 212 proceeds to be turned clockwise for a short distance in the first arc track 231 as designated by the arrow A4. When the limit block 212 is clockwise turned to the critical area C and the user stops pulling, the rotary member 23 will be turned counterclockwise as designated by the arrow A5 to retract the wire 1.

When the wire 1 is extended fully and the user wants to retract the wire 1, the limit block 212 on the rotary member 23 will be moved to the second arc track 232 to start the pulling force in a clockwise direction. If the distance between the second arc track 232 and the leveled areas 3, 30 is too short, the limit block 212 is unable to be moved to the first arc track 231 with ease, which may lower the function to retract the wire 1.

Referring to FIG. 4 and FIG. 5, the present invention not only improves the rotary member 23 but also keeps the limit block 212 to have a dual-positioning function when doing a circular motion, which controls the length of the wire 1 exactly. The present invention also reforms the definition of the dual positioning that is not easy for the user to retract the wire 1 of the first arc track 231 in a counterclockwise direction. The limit block 212 can be moved in first arc track 231 and the fourth arc track 234 in a counterclockwise direction for retracting the wire at a longer distance of the second arc track 232, or in a third arc track 233 and the sixth arc track 236 for extending the wire.

Figure 6:
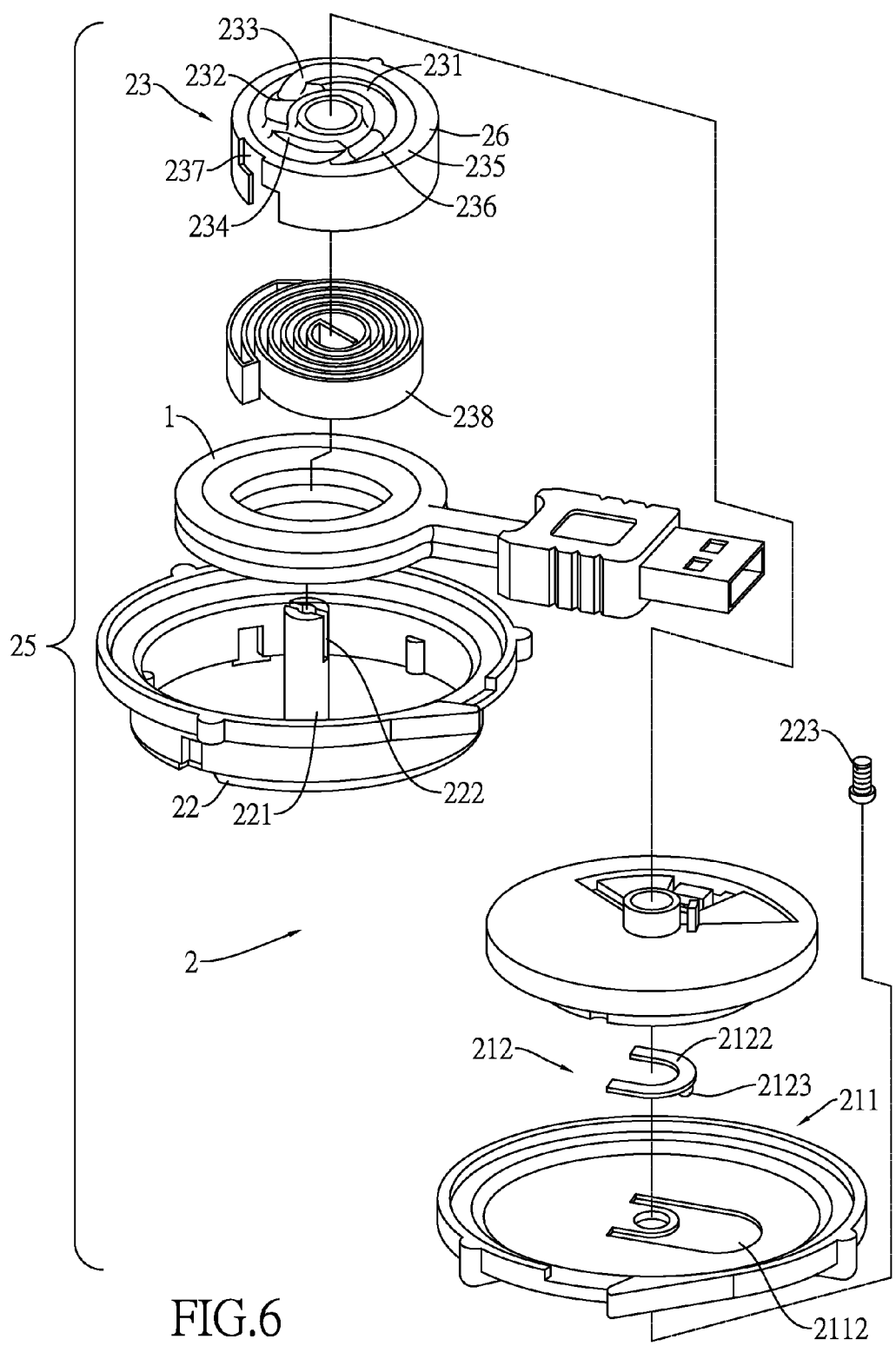
FIG. 6 is a schematic view of a second preferred embodiment of the present invention.
Figure 7:
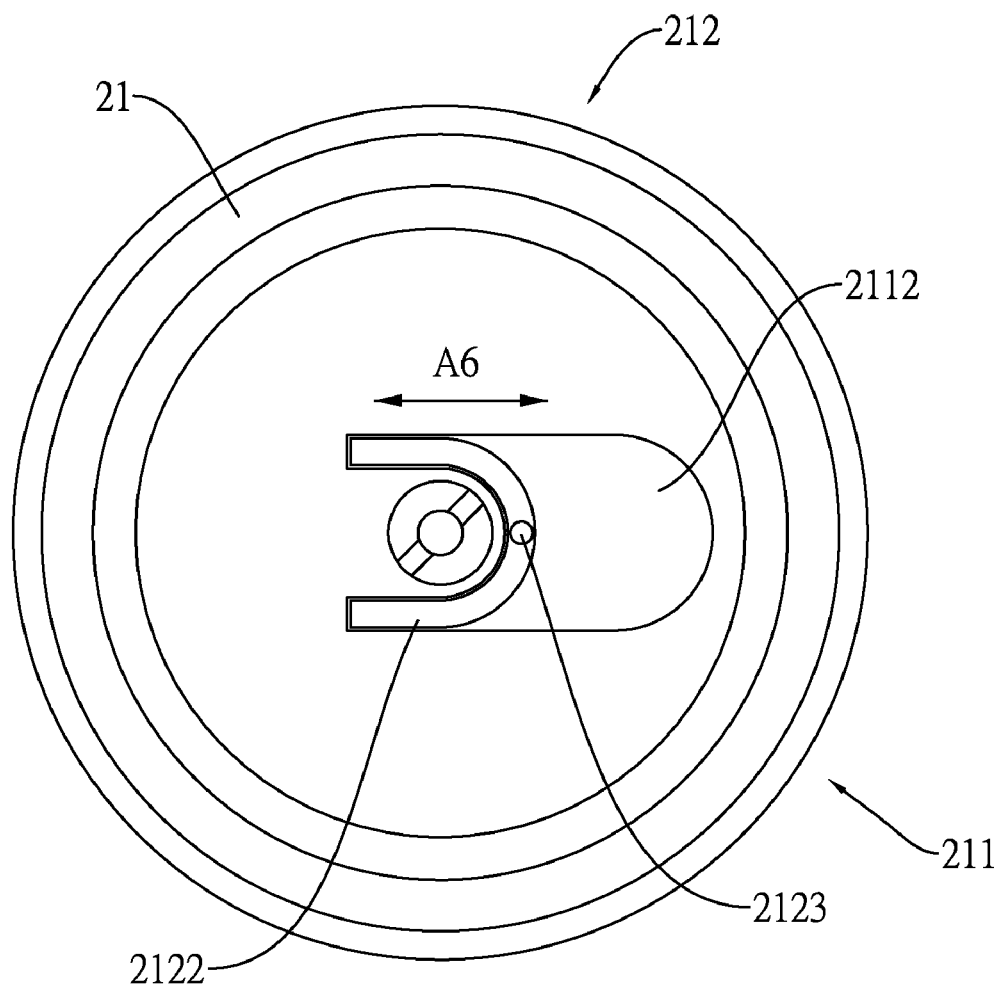
FIG. 7 is a schematic view showing the operation of the second preferred embodiment of the present invention.
Figure 8:
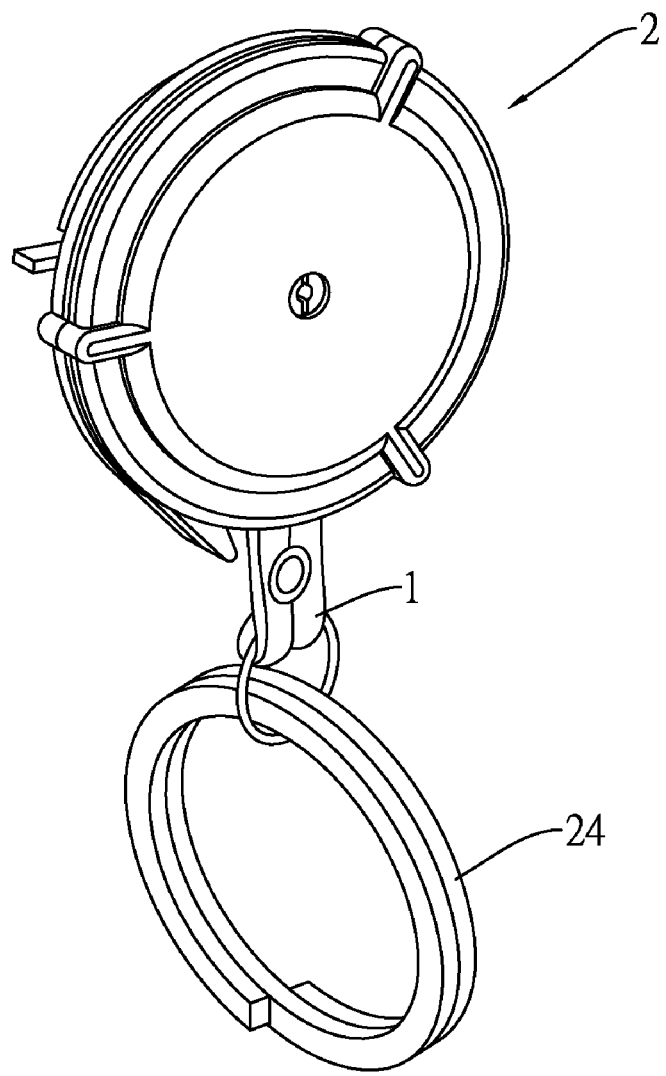
FIG. 8 is a schematic view of the present invention when in use.
Figure 9:
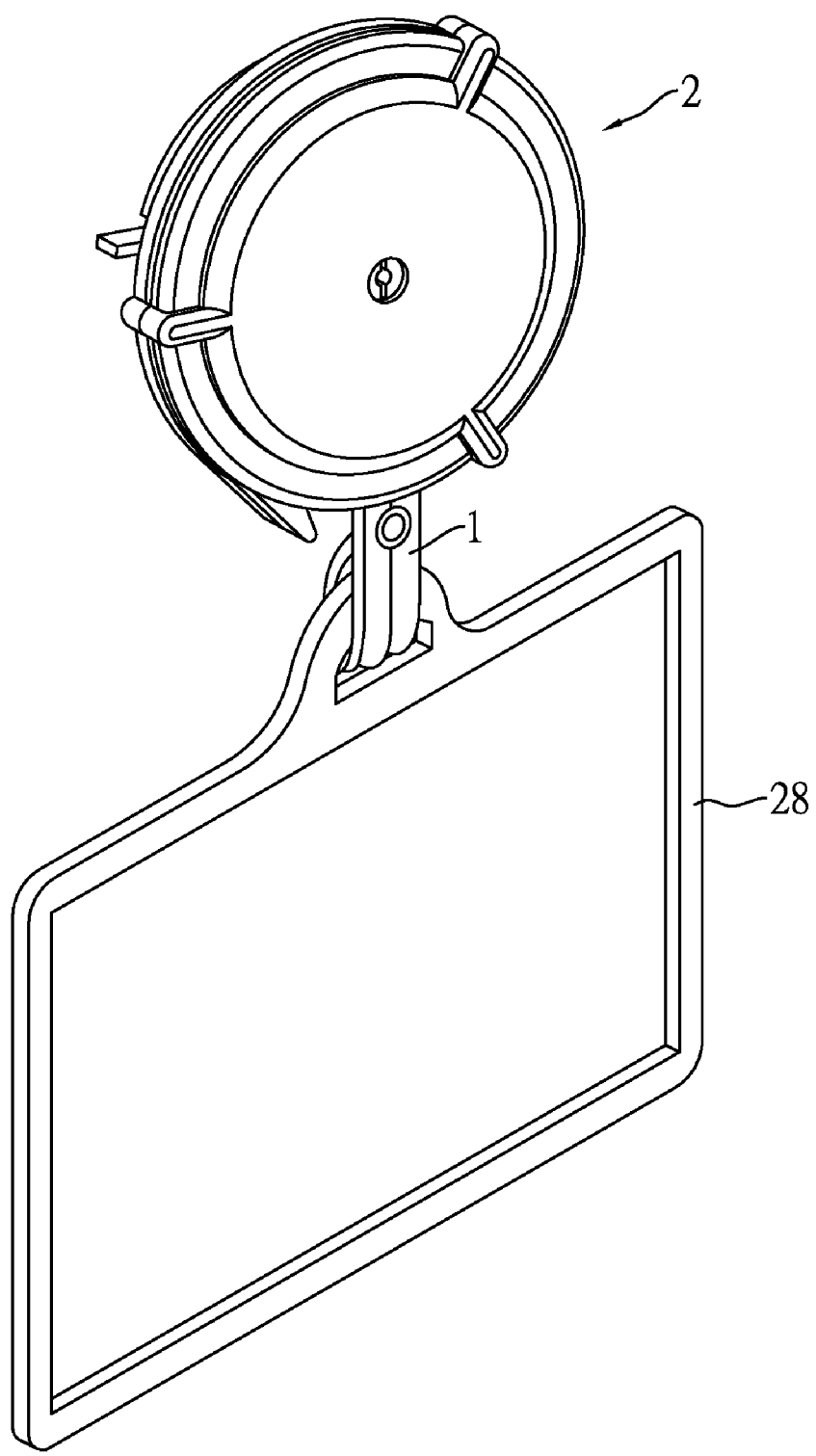
FIG. 9 is a schematic view of the present invention when in use.
Figure 10:
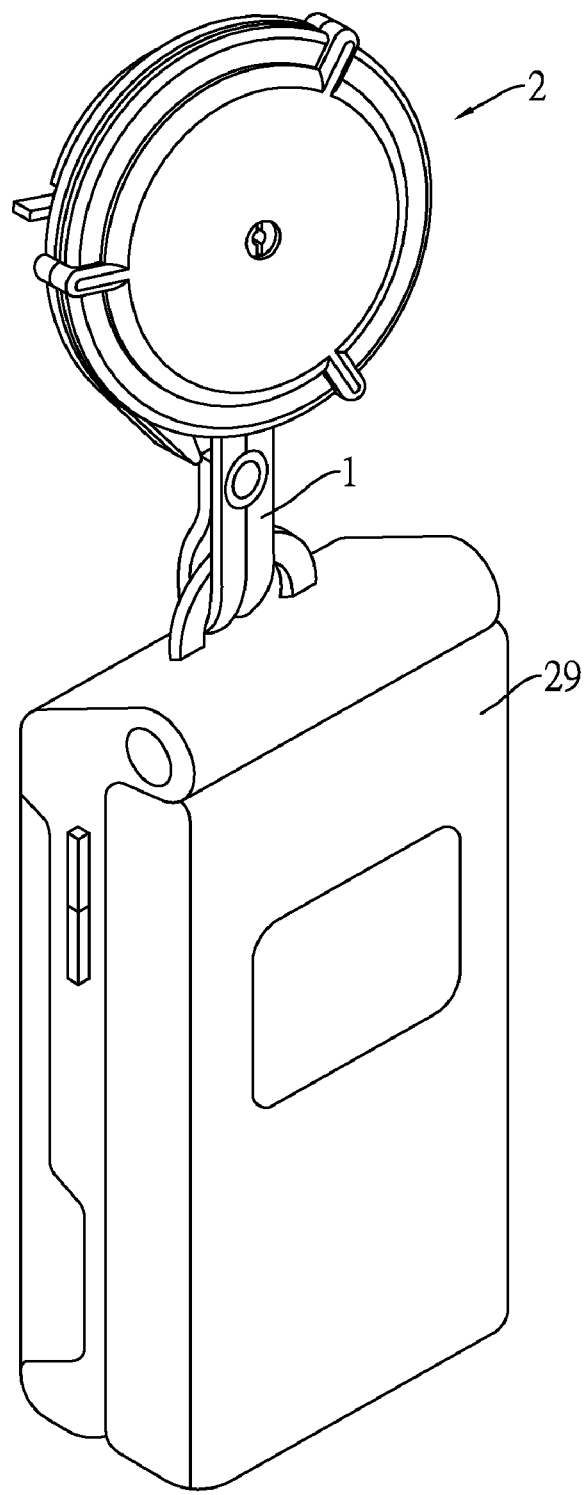
FIG. 10 is a schematic view of the present invention when in use.
Figure 11:
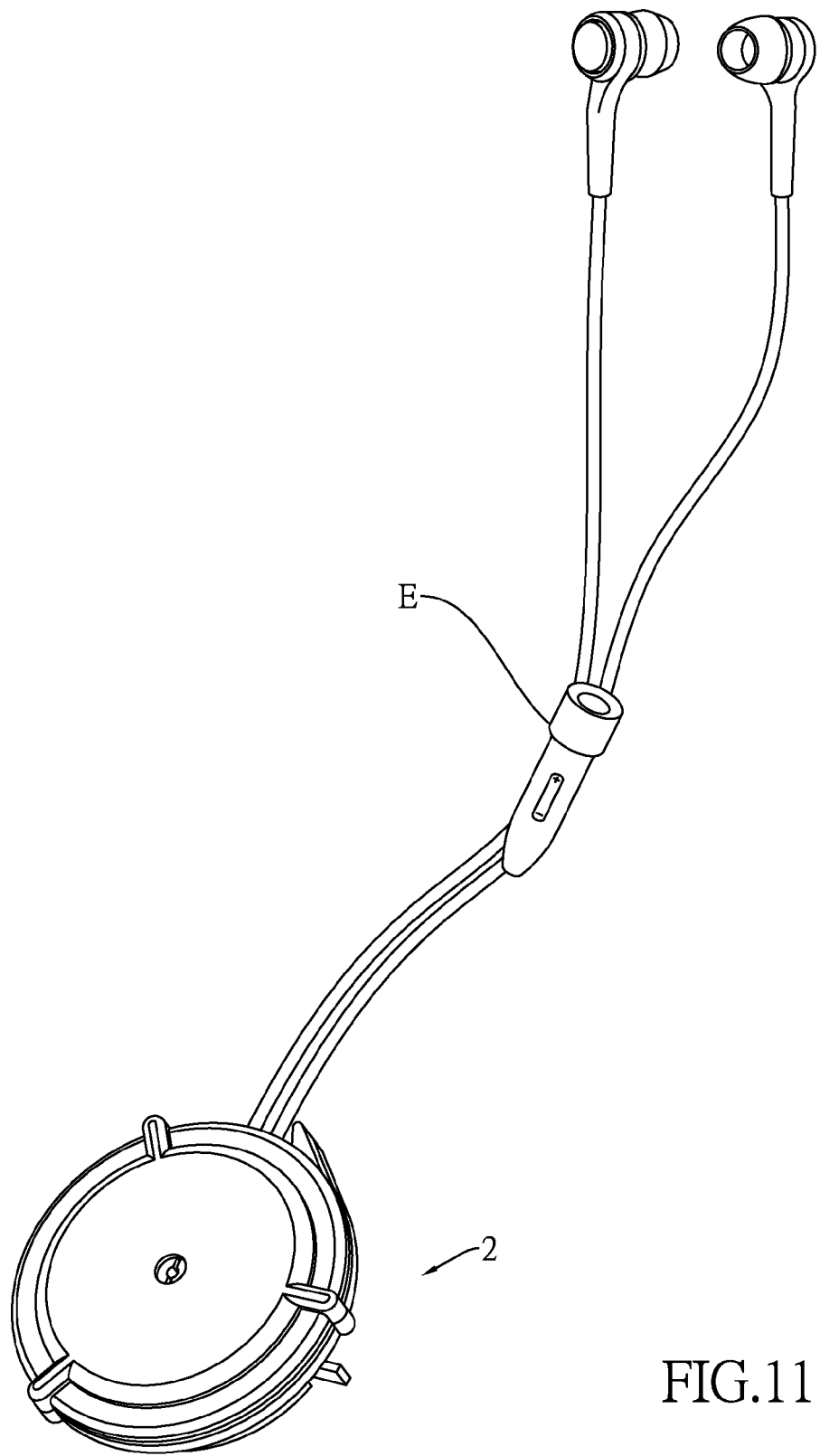
FIG. 11 is a schematic view of the present invention when in use.

Referring to FIG. 1, the limit block 212 is a ball 2121. The track area 211 is a linear limit trough 2111. The ball 2121 is moved linearly in the linear limit trough 2111. Referring to FIG. 6, the limit block 212 is a U-shaped block 2122. The track area 211 is a U-shaped trough 2112. The U-shaped block 2122 is moved in the U-shaped trough 2112 as designated by the arrow A6 of FIG. 7. The U-shaped block 2122 has a tenon 2123 thereon. The tenon 2123 is against the first arc track 231, the second arc track 232 and the third arc track 233. The aforesaid is about the limit block 212 and the track area 211 of the present invention in a different configuration.

The second limit unit 26 can be designed in a different embodiment. The inner side of the first casing 21 has a swing arm 27 which is deflected along an arc track, so that the swing arm 27 is confined to move in the fourth arc track 234. The swing arm 27 is disposed in a recess 271 formed on the inner side of the first casing 21. The swing arm 27 has a protruding rod 272 which is pivotally connected to the inside of the first casing 21. A covering plate 273 is provided on the protruding rod 272. The limit block 212 is the ball 2121 and the track area 211 is the linear limit trough 2111 to conform to this design.

As shown in FIG. 8 to FIG. 11, the present invention can be widely used to a key ring 24, a nameplate 28, a cell phone 29 or an earphone E.

Figure 12:
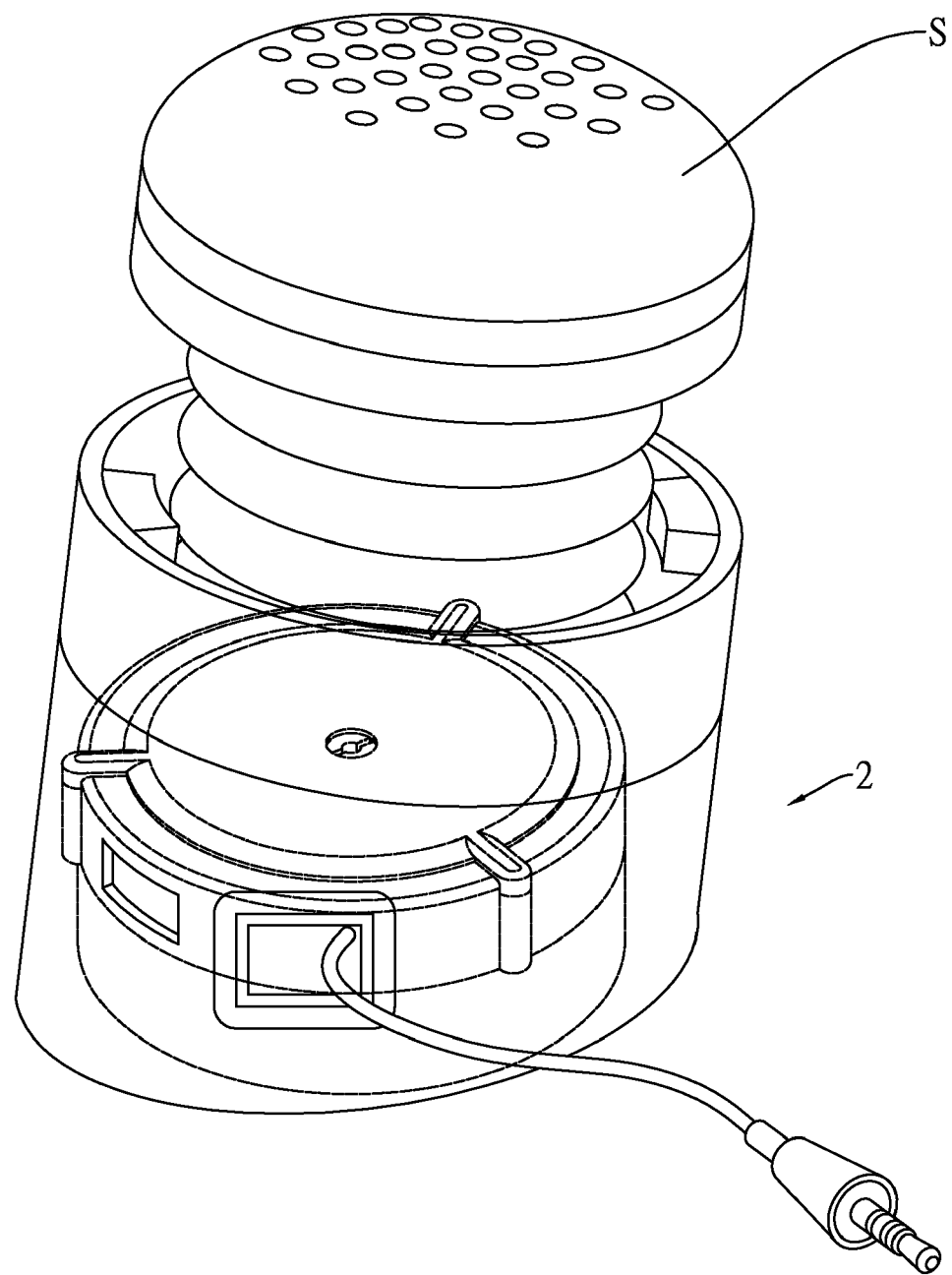
FIG. 12 is a schematic view of the present invention when in use.

As shown in FIG. 12, the reel 2 is coupled to the bottom of a mini speaker S to connect with a MP3 or an interface of a computer sound source.

Besides, the present invention can be applied to a hanging member of a cell phone, a key ring, a neck-type retractable device, a waist-type retractable device, a network modem, a retractable device for telephone transmission, a mouse, a keyboard, a headphone, a speaker, a sounder, a network telephone (Skype), a hub, a mobile digital sound machine, a computer peripheral communication device, an earphone, a retractable device for a music or sound transmission wire of a MP3 or a cell phone, a transformer, a pass hangtag, stationery or the like.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A single free-end wire reel, comprising a wire having one single free end, the wire being wound in a reel for extension and retraction when in use, the reel comprising a first casing and a second casing which are coupled to each other, a rotary member being provided in a space defined between the first casing and the second casing, the rotary member having an engaging notch on a circumferential portion thereof for connecting with the wire, a spiral spring being provided inside the rotary member to provide a force to turn the rotary member, a first limit unit being provided between an outer side of the rotary member and an inner side of the first casing to confine the rotary member in the first limit unit, a surface of the rotary member having a first arc track, a second arc track next to one end of the first arc track, a third arc track close to the second arc track, a track area being formed on the inner side of the first casing, a limit block being disposed in the track area, when the first casing and the second casing are coupled to each other and the rotary member is turned, the limit block in the track area of the first casing being confined to run in the first arc track, the second arc track and the third arc track, a second limit unit being provided between the outer side of the rotary member and the inner side of the first casing to disperse and balance the force of the first limit unit when the rotary member is deflected, the surface of the rotary member having a fourth arc track, the fourth arc track being symmetrical to the first arc track, one end of the fourth arc track having a fifth arc track which is symmetrical to the second arc track, a sixth arc track being disposed close to the fifth arc track, the sixth arc track being symmetrical to the third arc track, with the fourth arc track, the fifth arc track and the sixth arc track which are respectively symmetrical to the first arc track, the second arc track and the third arc track, the turning direction of the rotary member being not limited, leveled areas being provided between the first arc track, the fifth arc track and the sixth arc track to level a height difference between the first arc track, the fifth arc track and the sixth arc track, a stop gap being defined at the intersection of the first arc track and the fifth arc track.

2. The single free-end wire reel as claimed in claim 1, wherein the track area is a linear limit trough and the limit block is a ball.

3. The single free-end wire reel as claimed in claim 2, wherein the inner side of the first casing has a swing arm, the swing arm being confined to move in the fourth arc track.

4. The single free-end wire reel as claimed in claim 3, wherein a recess is formed on the inner side of the first casing, the swing arm having a protruding rod which is pivotally connected to the inside of the first casing, a covering plate being provided on the protruding rod.

5. The single free-end wire reel as claimed in claim 4, wherein the second casing has an inner side provided with a shaft for connecting with one end of the spiral spring.

6. The single free-end wire reel as claimed in claim 1, wherein the track area is a U-shaped trough and the limit block is a U-shaped block, the limit block having a tenon thereon, the tenon being against the first arc track, the second arc track and the third arc track.

7. The single free-end wire reel as claimed in claim 6, wherein the second casing has an inner side provided with a shaft for connecting with one end of the spiral spring.

\* \* \* \* \*